Feb. 13, 1934.    H. E. FRITZ ET AL    1,947,257
VALVE STRUCTURE
Filed April 25, 1933
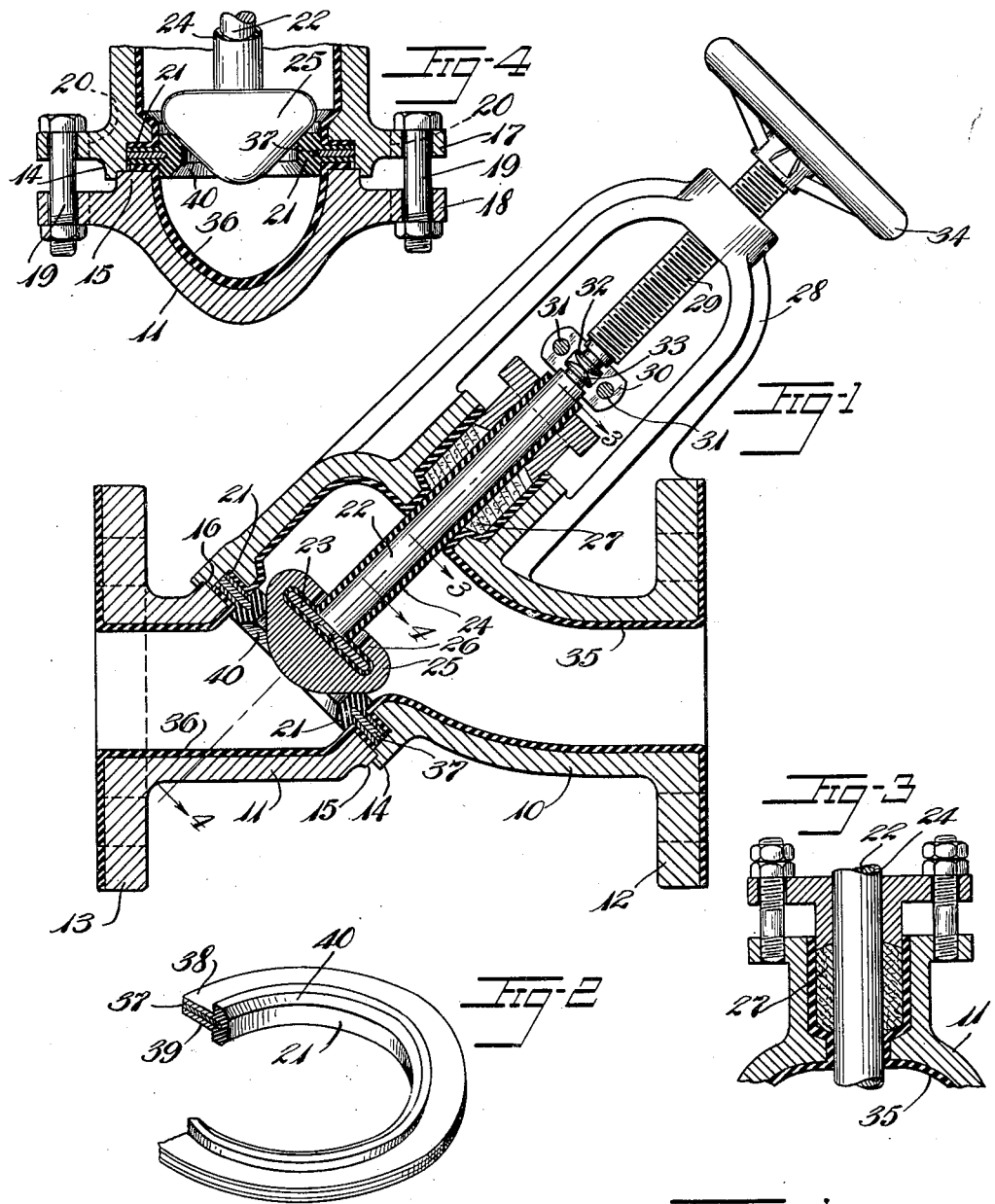
Inventors
Howard E. Fritz
John R. Hoover
By Eakin & Avery
Attys.

Patented Feb. 13, 1934

1,947,257

UNITED STATES PATENT OFFICE 1,947,257

VALVE STRUCTURE

Howard E. Fritz, Barberton, and John R. Hoover, Cuyahoga Falls, Ohio, assignors to The B. F. Goodrich Company, New York, N. Y., a corporation of New York Application April 25, 1933. Serial No. 667,798

2 Claims. (Cl. 251—156)

This invention relates to valves for controlling the flow of corrosive or abrasive fluids.

The principal objects of the invention are to provide adequate protection against corrosion and abrasion, to provide simplicity and economy of construction, to facilitate repair, and to provide efficiency and economy of operation.

Other objects will appear from the following description and the accompanying drawing.

In the drawing:

Fig. 1 is a central longitudinal cross-section of the valve.

Fig. 2 is a perspective view of the removable ring seat, part of the seat being broken away and part shown in section to illustrate its construction.

Fig. 3 is a sectional detail view of the packing gland, taken on line 3—3 of Fig. 1, other parts being broken away.

Fig. 4 is a sectional detail view of the valve and seat showing the body clamping members taken on line 4—4 of Fig. 1, other parts being broken away.

Referring to the drawing, the device includes a two-part body, the members of which are designated by the numerals 10 and 11. These are formed with terminal flanges 12 and 13 and are provided with cooperating nested meeting flanges 14 and 15. Flange 14 is formed with a step 16 to rigidly meet the flange 15 and properly align the parts of the body.

To provide for holding the body members in clamped relation the members are provided with ears 17 and 18 for receiving bolts 19. The one body member 11 may be clamped to the other member 10 either as shown or in another position in which the flange 13 would be angularly disposed with respect to flange 12 to provide an angle valve, the ears 17 being provided with arcuate slots 20 to permit angular adjustment. In either position it provides a continuation of the fluid passage of the major portion.

Flange 14 is counterbored to provide a recess for holding a removable seat 21.

The valve comprises a stem 22 having a head 23 of increased diameter and a hard rubber corrosion resistant covering 24 enclosing the stem and its enlarged end. A removable valve disc or plug 25 of soft rubber is retained thereon by an elastic lip 26 which resiliently engages back of the enlarged head.

To provide for endwise movement of the valve stem without rotation, the valve stem extends through the wall of the member 10, a packing gland 27 being provided to seal and guide the stem. A yoke 28 integral with the body member 10 is threaded in alignment with the stem to receive a screw 29. A split swivel collar 30 held together by bolts 31 rotatably engages over a button head 32 on one end of the screw and a similar head 33 on the end of the valve stem. A hand wheel 34 is mounted on the screw 29 to operate the same.

To provide against corrosion and abrasion, the body member 10 is provided with a corrosion and abrasion resistant lining 35 of rubber or other material which extends over its inner surface including the packing box and over the flange 12. A similar lining 36 extends over the inner surface of member 11 and over its flange 13.

The removable seat 21 is generally of T-shape in cross section, the stem portion of the section constituting the retaining flange and comprising a metal ring 37 faced with layers of rubber 38, 39, vulcanized thereto. Where the linings 35 and 36 are of soft rubber, the layers 38 and 39 are preferably made of hard rubber and where the linings 35 and 36 are of hard rubber or other rigid material soft rubber is preferably used for the layers 38 and 39 as it is important that the seat function as a seal between the linings 35 and 36, and that some compression of either the seat flange or the lining be provided.

The exposed portion of the seat is preferably beveled as at 40 on opposite sides so that the seat may be reversed when worn. The seating portion is made of hard rubber to cooperate effectively with the disc or plug 25 which is of soft rubber.

When repair of the valve is necessary the bolts 19 are loosened and the body member 11 removed. The seat 21 may then readily be removed or reversed for reuse; the screw 29 may be used to force the seat from its recess. As the disc or plug 25 is of elastic material it may now be removed and replaced by a new one without removing the valve stem. If it is desired first to remove the valve stem or to replace it, this may be accomplished by removing the swivel 30 and pushing the stem through the gland by aid of the screw with the aid of any convenient intermediate blocking material.

As the rubber covered stem 22 does not rotate in the gland but travels endwise only, wear thereof is reduced. It is well known that hard-rubber covered stems are somewhat liable to being scored by the packing. By the provision of packing tightening means operable to compress the packing only in the direction of travel of the stem, excessive wear of the packing is prevented as all scoring of the stem is accommodated by the flow of the packing and no scored surfaces move across the face of the packing as where the stem moves helically and adjustment of the packing lengthwise of the stem forces the packing across the helical scoring and shears the packing.

We claim:

1. A valve for corrosive or abrasive fluids, said valve comprising a rubber lined body member, a second rubber lined body member connected thereto to provide a continuation of the flow passage, a removable valve seat clamped between said members, a rubber covered valve member operable through a wall of one of said members, and a resilient detachable valve disc carried by said valve member and adapted to close said seat.

2. A rubber lined valve body provided with a valve seat, a rubber covered valve stem extending through a wall of the body, and a soft rubber plug member movable as a unit with the valve stem and resiliently and removably retained thereby for cooperation with the seat to close the valve.

HOWARD E. FRITZ.
JOHN R. HOOVER.